No. 766,546. PATENTED AUG. 2, 1904.
G. A. STILES.
EYEGLASSES.
APPLICATION FILED DEC. 2, 1903.
NO MODEL.
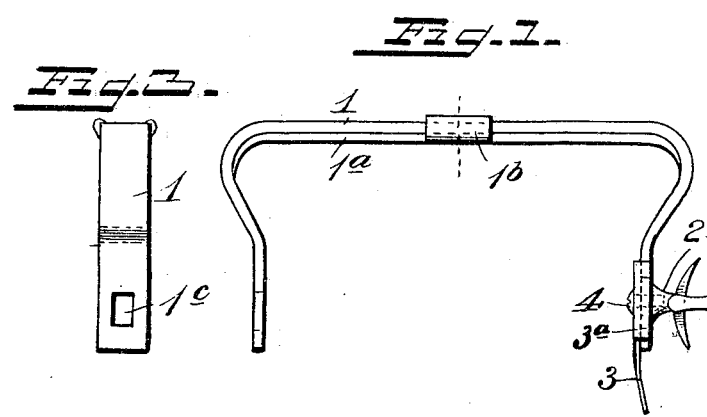
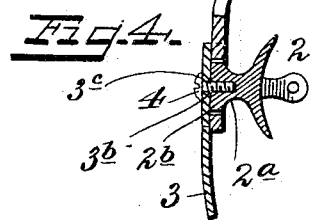
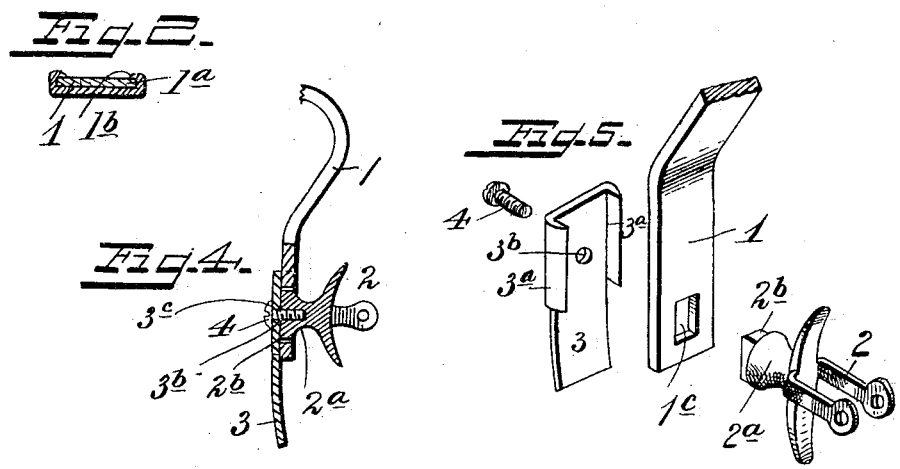
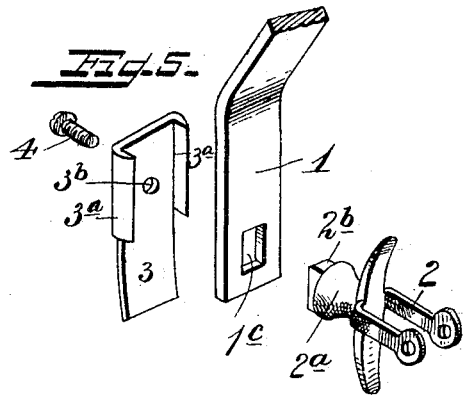
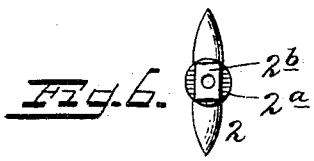
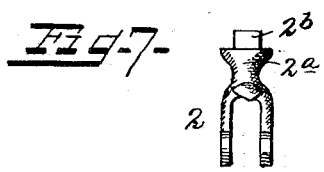
Witnesses:
Wm. N. Durand
S. S. Burket
Inventor:
G. A. Stiles.
By Louis Bagger & Co.,
Attorneys.

No. 766,546. Patented August 2, 1904.

UNITED STATES PATENT OFFICE.

GEORGE A. STILES, OF SOMERVILLE, MASSACHUSETTS.

EYEGLASSES.

SPECIFICATION forming part of Letters Patent No. 766,546, dated August 2, 1904.

Application filed December 2, 1903. Serial No. 183,509. (No model.)

*To all whom it may concern:*

Be it known that I, GEORGE A. STILES, a citizen of the United States, residing at Somerville, in the county of Middlesex and State of Massachusetts, have invented new and useful Improvements in Eyeglasses, of which the following is a specification.

My invention relates to improvements in eyeglasses, especially that type wherein the lenses or glasses are connected together by means of a spring, as distinguished from that class employing a rigid or inflexible bridge or nose-piece for connecting the lenses or glasses together.

Said invention has for its object principally to effectually guard against the parts working or becoming loose, as ordinarily experienced, requiring the frequent screwing or tightening up thereof to prevent their falling apart, which, it is obvious, is a continual source of annoyance and dissatisfaction. Said invention is also noted or characterized for simplicity and adapted to be readily applied and can be manufactured at the minimum expense and expeditiously.

Said invention consists mainly of a stud which may be adapted to be secured in the usual or any approved manner to the lens or glass, having an angular inner end or terminal engaging a corresponding aperture or opening produced in the lens-connecting spring near the end, and means for securing or retaining said parts together.

It consists, further, of the particular means for connecting up with the aforesaid parts or members the nose-engaging member or guard and also of effecting the holding in place all the parts or members by a single fastening, substantially as hereinafter more fully disclosed in the following description and particularly pointed out by the claims concluding said description.

In the accompanying drawings, illustrating the preferred embodiment of my invention, Figure 1 is a front elevation of an eyeglass-frame of the type above noted with said invention applied thereto. Fig. 2 is a cross-section produced on the line indicated upon Fig. 1. Fig. 3 is an end view of the same with the lens-holding stud and adjunctive parts removed. Fig. 4 is a broken sectional view taken through one end of the eyeglass-frame with the above-noted parts in position. Fig. 5 embraces the several leading features or parts of the invention disassembled and relatively disposed, and Figs. 6 and 7 are an end view and a side view of the lens-holding stud disconnected from the nose-engaging guard and spring.

In the carrying out of my invention I employ a spring 1, preferably of the construction shown, having clamps thereto, as at $1^b$, a bar $1^a$ with its ends or terminals conforming measurably to the end curvatures of said spring, as shown, to control or limit the extent of the gripping action of the spring as transmitted or exerted through the guards, hereinafter described. Said bar $1^a$ also has the effect to hold the lenses in horizontal or edgewise alinement to agreeably dispose the latter to the eyes, as will be evident. Said spring has its vertical or terminal portions provided with angular apertures or openings $1^c$, the purpose of which will presently be apparent.

A lens-holding stud or post 2, which is of usual construction where it engages the lens or may be any approved adaptation for that purpose, has, however, inward therefrom a shoulder $2^a$, preferably circular, while extending a suitable distance from said shoulder in the longitudinal plane of said stud is an angular extension or terminal $2^b$, preferably rectangular in cross-section, to adapt the same for engagement with one of the apertures $1^c$ in the terminals of the spring 1 above disclosed, the opposite lens-holding stud being similarly equipped or adapted for like engagement with the other of said apertures.

Guards 3, which bear upon or engage the nose for aiding the spring 1 to hold the glasses in position as when in use, are provided, the same having their upper end portions each formed with lateral flanges $3^a$, adapted to embrace laterally the pendent or vertical portions of the spring 1, as shown particularly in Fig. 1. Said upper end portion of each guard has also an aperture or hole $3^b$ therethrough intermediately of the flanges $3^a$ to receive or provide for the passage of a headed screw 4, screwed into a socket or aperture $3^c$, produced longitudinally in the angular stud or post 2, the walls of which socket or aperture are screw-threaded to effect engagement therebetween and the threads of said screw for the effective retention in place of the last-named, and consequently of the various parts. Of course it will be appreciated that when this connection of parts is effected the angular terminal or extension $2^b$ of the stud or post 2 is inserted in place in the corresponding aperture or opening $1^c$ in the spring 1 and that the guard 3 has been also applied to said terminal or extension with its flanges embracing laterally the same, whereby with the screw 4 screwed tightly in place said stud or post, said guard, and said spring are all connected together by a single fastening, and, further, they are prevented from becoming loose and finally falling apart. This latter is due more especially to the use of the angular extension or terminal $2^b$ of said stud and the corresponding aperture or opening $1^c$ in the spring-terminal and the lateral flanges $3^a$ on said guard embracing said spring-terminal, respectively.

Latitude is allowed as to details herein, as they may be changed without departing from the spirit of my invention and said invention yet remain intact and be protected.

I claim—

1. In eyeglasses of the character described, a lens-supporting stud having integral therewith an angular terminal, a spring having a corresponding aperture therethrough receiving said terminal, a nose piece or guard having lateral flanges engaging said spring laterally, and a common fastening-screw for said parts, passing through said guard and entering longitudinally said angular terminal.

2. In eyeglasses of the character described, a lens-supporting stud having a shoulder and extending from the latter an angular terminal, a spring having an angular aperture receiving said angular terminal, a nose-guard having integral therewith lateral flanges embracing said spring, and a fastening inserted through an aperture in said nose-guard and engaging a screw-threaded socket in said lens-supporting stud, the head of said fastening engaging said guard.

3. In eyeglasses of the character described, a spring having angular apertures therein and a bar clamped thereto, said spring having its terminals or end portions conformed measurably to the bends or curvatures of said spring, at points intermediately of its horizontal and vertical portions, a lens-supporting stud having integral therewith an angular terminal let into the corresponding aperture of said spring, a nose-guard, and means connecting together said spring, stud and guard.

In testimony whereof I have signed my name to this specification in the presence of two subscribing witnesses.

GEORGE A. STILES.

Witnesses:
 GEO. L. PARKER,
 JOHN L. McKEON